Patented Apr. 30, 1935

1,999,363

UNITED STATES PATENT OFFICE 1,999,363

HYDROGENATION PROCESS

André Jean Kling and Jean Marie Felix Daniel Florentin, Paris, France, assignors to Societé des Carburants Synthetiques, Paris, France, a societe anonyme of France No Drawing. Application May 4, 1933, Serial No. 669,366. In France May 11, 1932

4 Claims. (Cl. 196—53)

This invention relates to the conversion of phenolic bodies and tars of low temperature distillation into benzenic hydrocarbons by a hydrogenation process.

It is known that specially active dehydrating catalysts can be obtained by heating the oxides of metals belonging mainly to the third, fourth and sixth groups of the periodic table of the elements, to high temperature before their use, the temperature being of the order of 700° C. or higher. We have found, in particular, that mixtures of alumina, zirconia, thoria, etc., activated in this way, with various reducible oxides such as the oxides of molybdenum, tungsten, etc., likewise activated, are particularly suited for bringing about the conversion of phenols and low-temperature tars into hydrocarbons.

Continuing those researches, we discovered that these catalysts could be utilized, in presence of hydrogen, at quite low pressures and even at the atmospheric pressure; however, it is generally at pressures lying between 5 kgs. per sq. cm. and 15 kgs. per sq. cm. that the best yields are obtained while preserving the benzene nucleus.

But, when utilizing catalysts constituted wholly or in part by readily reducible oxides (such as the oxides of molybdenum, tungsten, etc.), it is found that sometimes the activity of the catalyst falls rapidly and tends to become nil.

By careful study of this phenomenon, we found that the loss of activity was due to a conversion of the catalyst, in particular to its reduction under the action of hydrogen, and that it was therefore important in order to avoid this phenomenon to operate at a temperature below the lower limit of reduction by hydrogen of the oxide in question, which limit approximates to 440° C. at low pressures, varying of course with the pressure of hydrogen. On the other hand, if the hydrogen is not under some pressure, there will be a formation of tar upon the catalyst, such tar putting a stop to the catalytic action.

Very good results are obtained in this way, by effecting the conversion of phenolic bodies and low-temperature tars in presence of reducible oxides mixed with non-reducible oxides (alumina, chromium oxide, etc.) and by passing the phenolic or like vapors over the catalyst raised to temperatures ranging from 360° to 430° C., in presence of hydrogen, under pressures of 15 to 5 kgs. per sq. cm. It is desirable, in order to have a high reaction speed, to operate at the highest temperature possible while keeping clearly below the lower limit of reduction of the oxides. In the case of the oxides of tungsten and molybdenum, the optimum temperature is about 400° for pressures of the order of 10 kgs. per sq. cm. The process therefore allows, with relatively simple and inexpensive apparatus, the conversion of phenolic bodies and low-temperature tars into hydrocarbons consisting very largely of benzenic hydrocarbons.

It is likewise a simple matter, in case the activity of the catalyst should fall, due to any error, to regenerate the catalyst by passing into the catalysis tube, for about two hours, a current of oxygen or air at a temperature of 500°. The catalyst regenerated in this way has been found to be just as active as the original catalyst.

The present invention therefore relates to a process for converting phenolic bodies and low-temperature tars into hydrocarbons, in the presence of hydrogen under low pressure, that is, up to a maximum of 15 kgs. per sq. cm., with the use of hydrogenating catalysts, constituted by mixtures of reducible and non-reducible oxides of such metals, and at temperatures lying between 360° and 430° C., that is, such that they are below the lower limit for the conversion of the reducible oxides into metals in the conditions of operation, while being clearly above the lower limit of the catalytic action. Preferably, the catalysts used in the process and under the conditions mentioned, are first activated by preliminary heating to temperatures of 700° C. or higher.

Two examples of the application of the novel process are given hereunder with reference to the accompanying drawing:

I. Into a steel tube $a$, 3 meters high, filled with pumice stone or terra cotta rings, covered with a mixture in equal parts of activated alumina and activated blue oxide of molybdenum, there are passed at the top commercial phenolic oils from a tank $b$ and a current of hydrogen from a supply at $c$, in such a way as to produce in the apparatus $a$ constant pressure of 10 kgs. per sq. cm. The proportion of phenolic oil to hydrogen may be between 900 milligrams and 1 gram of oil to each litre of hydrogen, and the speed of flow such that the current traverses the length of the tube in about 2 minutes. The tube is raised to a temperature of 390 to 400° C. by suitable heating means $d$. By cooling the gases which are evolved, on the one hand in a cooler $e$, and by distilling the liquid which is collected at the lower part of the tube, on the other hand, in a rectifying column $f$, there are obtained at the outlet $g$ hydrocarbons representing a conversion of about 60 per cent of all the phenols present.

These hydrocarbons, having a density of .840 to .850 at 15° C., are constituted for the greater part by benzene, toluene, etc.

The life of the catalyst is over 300 hours, without regeneration.

II. The medium oils from a low-temperature coal-tar, containing 83 per cent of phenols in all, are treated in a similar way to that of Example I, utilizing the same apparatus but with a catalyst consisting of a mixture in substantially equal parts of the activated oxides of tungsten and molybdenum ($W_2O_5 + Mo_2O_5$); the temperature of the tube is 385 to 390° C. and the pressure in the tube is 7.5 kgs. per sq. cm.

In this case, the conversion amounts to 65 per cent of the theoretical yield.

What we claim is:—

1. Process for converting phenolic bodies into benzenic hydrocarbons, comprising the passage of the vapors and hydrogen under a pressure of 10 kilograms per square centimeter over a catalyst constituted by a mixture of substantially equal parts of alumina and blue oxide of molybdenum, and at a temperature of approximately 400° C.

2. Process for converting low-temperature tars into benzenic hydrocarbons, comprising the passage of the vapors and hydrogen under a pressure of 10 kilograms per square centimeter over a catalyst constituted by a mixture of substantially equal parts of activated oxides of tungsten and molybdenum, and at a temperature of approximately 390° C.

3. A process for converting phenolic bodies and low-temperature tars into hydrocarbons, comprising passing the vapors with hydrogen under a pressure lying between atmospheric and 15 kilograms per square centimeter, over a catalyst constituted by a mixture of oxides of metals selected from aluminum, zirconium, thorium, chromium, tungsten and molybdenum, and at a temperature lying between 360° and 430° C., said temperature being below the lower limit for the reduction of the most easily reducible of said oxides into metal in the conditions of operation, and above the lower limit for said catalyst to act upon the bodies treated.

4. A process for converting phenolic bodies and low-temperature tars into hydrocarbons, comprising passing the vapors with hydrogen under a pressure lying between atmospheric and 15 kilograms per square centimeter, over a dehydrating catalyst constituted by a mixture of activated oxides of metals selected from aluminum, zirconium, thorium, chromium, tungsten and molybdenum, and at a temperature lying between 360° and 430° C., for the higher and lower limits of said pressure respectively, said temperature being below the lower limit for the reduction of the most easily reducible of said oxides into metal in the conditions of operation and above the lower limit for the action of said catalyst upon the bodies treated.

ANDRÉ JEAN KLING.
JEAN MARIE FELIX DANIEL FLORENTIN.